Figure 1:
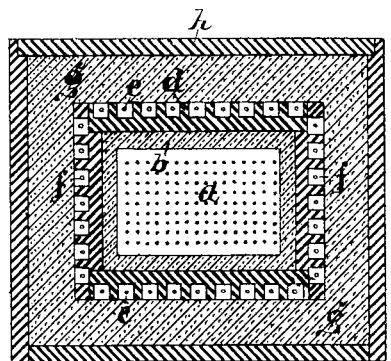

(No Model.) 2 Sheets—Sheet 1.

G. B. PENNOCK.
UNDERGROUND CONDUIT FOR ELECTRIC WIRES.

No. 328,712. Patented Oct. 20, 1885.

WITNESSES:

INVENTOR
George B. Pennock.

(No Model.) 2 Sheets—Sheet 2.
G. B. PENNOCK.
UNDERGROUND CONDUIT FOR ELECTRIC WIRES.
No. 328,712. Patented Oct. 20, 1885.
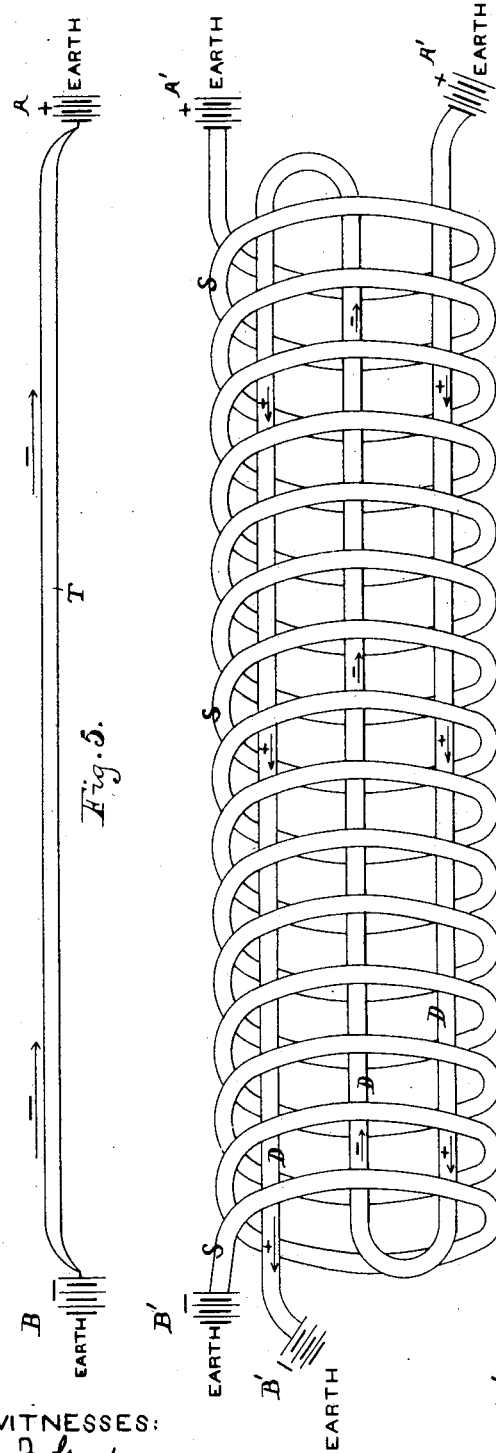
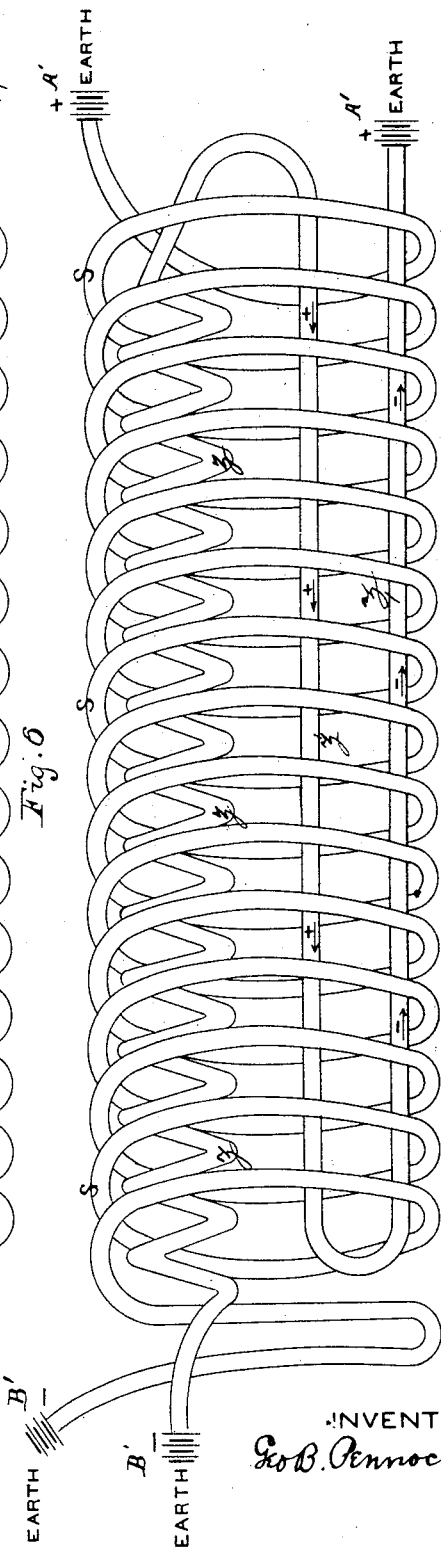
WITNESSES:
INVENTOR

UNITED STATES PATENT OFFICE.

GEORGE B. PENNOCK, OF PHILADELPHIA, PENNSYLVANIA.

UNDERGROUND CONDUIT FOR ELECTRIC WIRES.

SPECIFICATION forming part of Letters Patent No. 328,712, dated October 20, 1885.

Application filed October 23, 1884. Serial No. 146,339. (No model.)

*To all whom it may concern:*

Be it known that I, GEORGE B. PENNOCK, a citizen of the United States, residing at Philadelphia, in the State of Pennsylvania, have invented a new and useful Improvement in Underground Conduits for Electric Wires, of which invention the following is a specification.

Underground conduits consisting of hollow structures—such as metallic boxes, tubes, terra-cotta pipes, &c.,—with man-holes—have failed to give satisfaction because of their not being water-tight and because of their great cost. In drawing a cable or single wire through such conduits the former is liable to be stripped of its outer covering, or broken, and the latter to suffer abrasion.

Hitherto in underground conduits composed of solid sections united together the sections, separately considered, have consisted of the requisite number of insulated wires incased in a metallic tube, the wires having been drawn into the tube and the interstices filled with an insulating substance applied while in a fluid or plastic state, or they have consisted of the requisite number of insulated wires incased as a whole in a metallic cover wrapped or formed around them.

Apart from the above-stated objections to drawing electric wires into tubes, there are objections which are common to these several forms of conduit composed of solid sections, to wit: first, that the metallic cases, under some conditions—such, for instance, as inclosed moisture—act as conductors, causing the electric current to escape from the inclosed wires to the ground; second, that the wires are not, without disturbing the solidity of the main conduit, accessible for lateral connections.

The object of my invention is to produce for telephone and telegraph wires a comparatively inexpensive underground conduit, so constructed, first, that the insulated wires shall be completely protected against moisture and decay; second, that the telephone-wires shall be widely separated from the telegraph-wires by insulating and sound-deadening substances, with a view to prevent leakage and lessen induction; third, that the wires shall have capacity to be easily tapped and by means of connecting-wires extended into any number of houses along the line of the conduit without disturbing the solidity and moisture-resisting capacity of the main conduit; fourth, that the telephone-wires shall be grouped in the middle of the conduit, and, with the view of diverting inductive action of the telegraph-wires upon them, some of the telephone-wires shall have a spiral form, some run in a zigzag course, and some of them double on themselves through the section before passing into the sleeve which unites such section with the neighboring section of the conduit; fifth, that the individual sections, in order to avoid abrasion or breakage of wires, shall be formed by laying or placing the wires without drawing them in their required positions and surrounding and separating them with water-proof insulating and sound-deadening substances, as hereinafter specified.

I make the sections of the conduit in lengths of about sixteen feet each, or of any other convenient length, and completely finish them before they are taken on the ground—that is to say, the spaces between the telephone-wires, which are preferably grouped in the middle of the conduit, are filled with gutta-percha, pitch, or other insulating water-proof material applied in a fluid, semi-fluid, or plastic state and allowed to harden; sound-deadening materials are packed around and caused to envelop the group of telephone-wires; the telegraph-wires are adjusted in their several cells and enveloped with a thick jacket of the aforesaid insulating water-proof materials, applied as above mentioned, the whole inclosed in a wooden case constituting a solid, insulated, impermeable mass. The sections thus made are laid in line in trenches a short distance apart and united by sleeves, within which the corresponding wires of neighboring sections are spliced together, any required number of the wires being caused to form loops, which project laterally through apertures formed for this purpose in opposite sides of the sleeve, the said loops and apertures being covered by water-proof caps or boxes, through which loops lateral wires in any required number may be attached to the wires of the main conduit.

Figure 2:
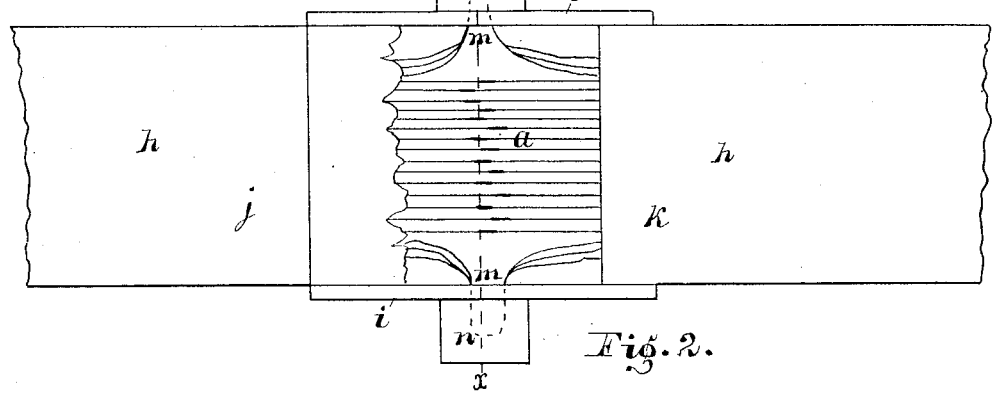

In the annexed drawings, Figure 1 is an end view of a section of my improved underground conduit; Fig. 2 a top and Fig. 3 a side view of two sections of the same placed in line and united by a sleeve; Fig. 4, a cross-section through the sleeve on the line x x of Fig. 2. Fig. 5 is an elevation of a telegraph-wire in one section of the main conduit for showing the assumed direction of the electrical current. Figs. 6 and 7 illustrate my arrangement of the telephone-wires in each of the sections of the conduit for deflecting and neutralizing the inductive action of the telegraph-wires upon them, Fig. 6 being an elevation of two telephone-wires, one doubled on itself and the other arranged spirally; Fig. 7, a like view of two telephone-wires, one partly zigzagged and partly doubled on itself, the other arranged spirally.

$a$ represents the group of insulated telephone-wires, the spaces between which are filled with gutta-percha, pitch, or other waterproof insulating substances susceptible of application in a fluid, semi-fluid, or plastic state.

$b$ is a lining of rock-wool or other sound-deadening substances, which not only act as insulators, but also to protect the telephone-wires against the transmission of vibrations proceeding from the telegraph-wires or from any sources exterior to the group of telephone-wires.

$d$ is a trunk or box, of wood or of boards composed of paper, straw, or wood pulp, in the outer surfaces of which are formed grooves or cells $e$ to receive the insulated telegraph-wires $f$.

$g$ is a body of gutta-percha, pitch, or other water-proof insulating substances, applied as above mentioned.

$h$ is the inclosing-box, of wood or board.

Figure 3:
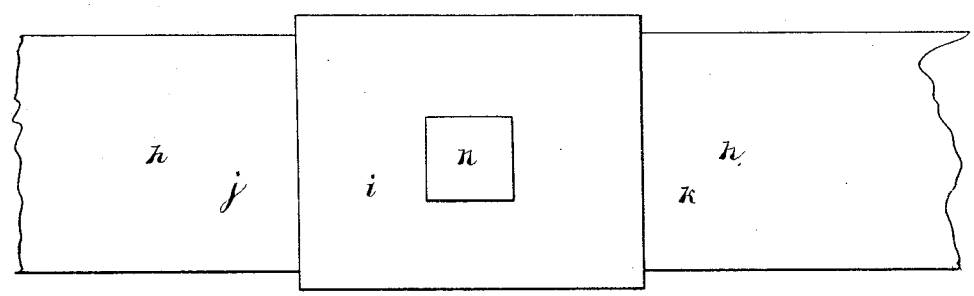
Figure 4:
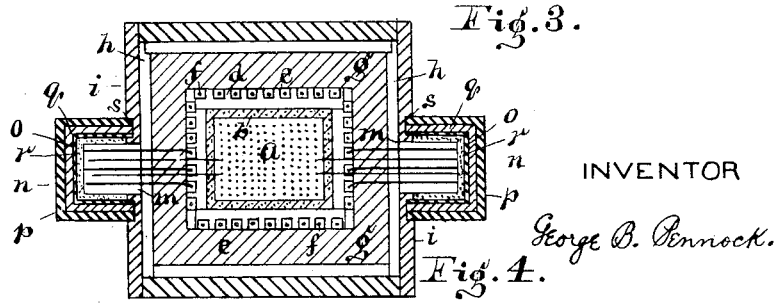

$i$ is a sleeve for uniting two neighboring sections—such as $j$ and $k$, Figs. 2 and 3—of the conduit. The sleeve $i$ consists of a box of wood, which closely overlaps the ends of sections $j$ and $k$.

$m$ are apertures in the opposite sides of the sleeve $i$.

$n$ are wooden boxes or caps which cover the apertures $m$. These caps consist each of an inner box, $o$, an outer box, $p$, of wood, with an intervening space, $q$, filled with the water-proof insulating substances before mentioned, the inner box, $o$, being lined with rock-wool or other equivalent sound-deadening substances, $r$. The caps, when in position, fit into rabbets or grooves $s$ formed in the sides of the sleeve. It will be seen that the wires of neighboring sections are spliced in the sleeve-spaces, as many of the wires as may be required for lateral connections being caused to extend through the apertures $m$, as shown, to form, by being doubled on themselves, loops, to which lateral wires extending into buildings along the line on either side of the conduit may be attached, as required. After the splicing of the wires in the sleeve the spaces therein between the wires are filled with gutta-percha, pitch, or other equivalent insulating water-proof substance, the rock-wool or other equivalent sound-deadening material being formed into a jacket around the group of telephone-wires, and the spaces between the telegraph-wires and between the jacketed telephone-wires and the plank or board walls of the sleeve are filled with the gutta-percha, pitch, or other equivalent water-proof insulating substance.

For the purpose of illustrating the deflecting and neutralizing action of the telegraph-wires on the telephone-wires when both systems are contained in one conduit, I have in Figs. 6 and 7 shown methods of arranging the telephone-wires in one (each and every) section of the main conduit, and this section may be regarded as standing for the whole line.

In Fig. 5, T represents a telegraph-wire; A, a battery at the end with its positive (+) pole to line; B, a battery with its negative (—) pole to line; their reverse poles to the earth. $\longrightarrow$ represents a positive current flowing out on the line—say north.

In Fig. 6, A' represents a battery at the distant end of the line; B', a battery with its negative (—) pole to line; S, a telephone-wire running in spiral form, connected with the battery B' negative (—) pole to line, and ending at battery A' positive (+) pole to line. D represents a telephone-wire doubled on itself, and around it the telephone-wire S is arranged spirally. The arrangement of the terminal batteries for wire D is the same as for wire S. $\longleftarrow$ represents the induced current positive (+) flowing south. $\longrightarrow$ represents the original induced current negative (+) flowing north.

In Fig. 7, S represents a spiral telephone-wire, batteries being arranged as in Fig. 6. Z represents a telephone-wire in zigzag course, a portion of it being plain and doubled on itself. $\longleftarrow$ represents an induced current flowing south; $\longrightarrow$ an induced current flowing north, neutralizing each other and flowing into neutral pole A'. There are no induced currents on the spiral or zigzag wires.

When it is desired to attach lateral wires to the loops of the main wires of the conduit, the boxes $n$ are removed.

The lateral wires extending into the cellars of buildings situated on either side of the main conduit form smaller conduits, which are made solid, and protected in the same manner as above specified in regard to the main conduit.

I claim—

1. For telephone and telegraph wires, an underground conduit constructed in sections, each consisting of a solid, impermeable, insulated mass in which the telephone-wires are grouped in the middle and surrounded by a jacket of rock-wool or other equivalent sound-deadening substance, exterior to which are arranged the telegraph-wires which are inclosed in water-proof insulating materials, the whole contained in a board case, substantially as set forth.

2. In a moisture-proof underground conduit for electric wires, the combination of any section, j, and its neighboring section, k, with a wooden sleeve, i, which is provided with side apertures, m, covered with the removable double-walled, rock-wool-lined wooden boxes n, into which some or all the wires of the main conduit are looped, substantially as set forth, for the purpose of facilitating the attachment of lateral wires and conduits without disturbing the solidity of the main conduit.

3. For combined telephone and telegraph circuits, an underground conduit constructed in sections, each consisting of a solid, impermeable, insulated mass in which the telephone-wires are grouped in the middle, some or all of them being coiled around a central conducting-wire, (which is doubled on itself,) others caused to describe a zigzag course, or to return on themselves, the said telephone-wires being surrounded with a jacket of rock-wool or other equivalent sound-deadening and insulating substance, exterior to which are arranged the telegraph-wires which are inclosed in water-proof insulating materials, all contained in a casing, substantially as set forth, for the purpose of diverting and neutralizing any magnetic currents induced in the telephone-wires by the telegraph-wires.

GEORGE B. PENNOCK.

Witnesses:
W. G. PERRY,
HENRY O. TERRY.